(12) United States Patent
Fourney

(10) Patent No.: US 7,588,137 B2
(45) Date of Patent: Sep. 15, 2009

(54) CONVEYOR BELT HAVING ROLLERS THAT DISPLACE OBJECTS

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 12/054,663

(22) Filed: Mar. 25, 2008

(65) Prior Publication Data
US 2008/0251359 A1 Oct. 16, 2008

Related U.S. Application Data

(63) Continuation of application No. 11/735,068, filed on Apr. 13, 2007, now Pat. No. 7,360,641.

(51) Int. Cl.
*B65G 17/24* (2006.01)
(52) U.S. Cl. .................... 198/779; 198/853
(58) Field of Classification Search ............... 198/779, 198/850, 853, 781.08, 370.01, 370.09
See application file for complete search history.

(56) References Cited

U.S. PATENT DOCUMENTS

| 3,675,760 A | 7/1972 | Burrage et al. |
| 4,293,064 A | 10/1981 | Robinson |
| 5,190,137 A | 3/1993 | Tas |
| 5,238,099 A | 8/1993 | Schroeder et al. |
| 2007/0068776 A1 | 3/2007 | Costanzo |

OTHER PUBLICATIONS

International Search Report and Written Opinion, dated Sep. 12, 2008.

*Primary Examiner*—James R Bidwell
(74) *Attorney, Agent, or Firm*—Thomas, Kayden, Horstemeyer & Risley, LLP

(57) ABSTRACT

In one embodiment, a conveyor belt includes multiple roller sets, each roller set including a first roller and a second roller, the first and second rollers being placed in contact with each other such that driving of one of the rollers in a first angular direction causes rotation of the other roller in a second, opposite angular direction.

10 Claims, 9 Drawing Sheets

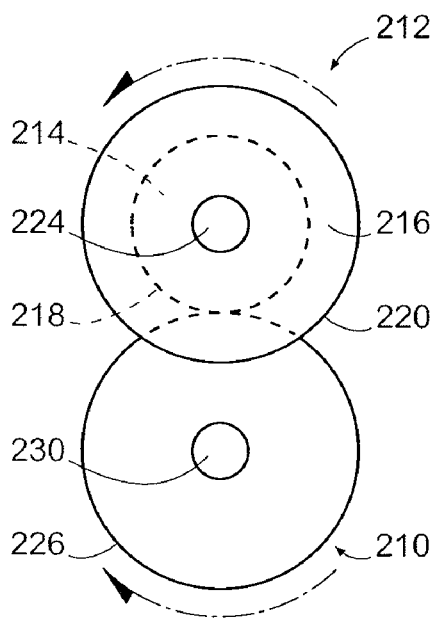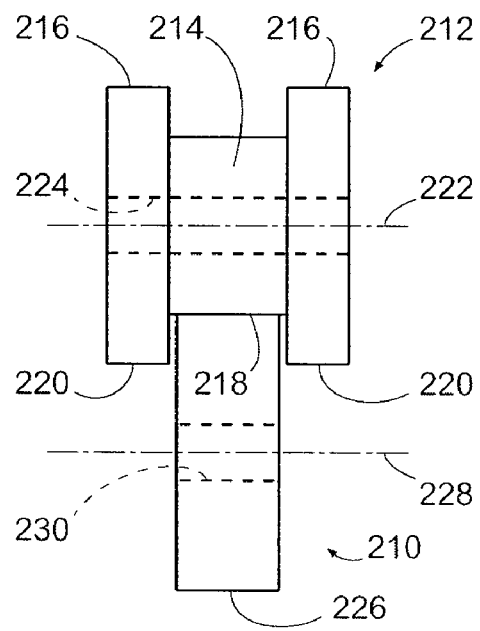
FIG. 13           FIG. 14
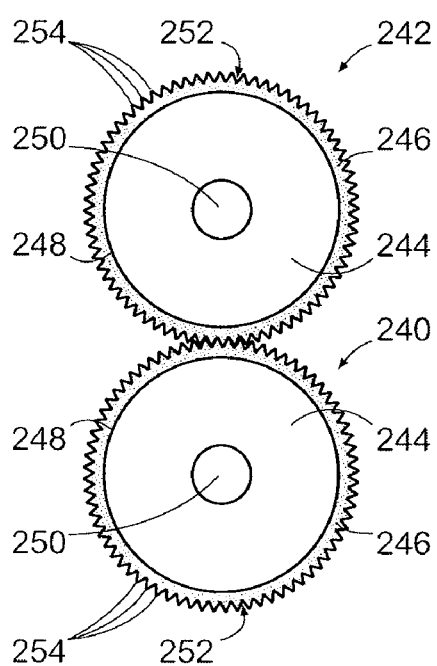
FIG. 15

CONVEYOR BELT HAVING ROLLERS THAT DISPLACE OBJECTS

CROSS-REFERENCE TO RELATED APPLICATION

This application is a continuation of copending U.S. utility application entitled "Conveyor Belts Having Rollers That Displace Objects," having Ser. No. 11/735,068 and filed Apr. 13, 2007, now U.S. Pat. No. 7,360,641, which is entirely incorporated herein by reference.

BACKGROUND

Conveyor belts sometimes include rollers that are used to divert objects from the belt in a chosen lateral direction. In some systems, rollers are positioned such that their axes of rotation align with a direction of belt travel such that the rollers can rotate in a transverse direction. In other systems, the rollers are positioned at an angle relative to the direction of belt travel. In either case, however, the angles with which the objects can be diverted from the conveyor are limited.

BRIEF DESCRIPTION OF THE DRAWINGS

The disclosed conveyor belts can be understood with reference to the following drawings. The components in the drawings are not necessarily to scale.

FIG. 13 is a side view of a first alternative embodiment of rollers that can be used in a conveyor belt.

FIG. 14 is an end view of the rollers of FIG. 13.

FIG. 15 is a side view of a second alternative embodiment of rollers that can be used in a conveyor belt.

DETAILED DESCRIPTION

Described in the following are conveyor belts having rollers that can be used to displace objects conveyed by the belts. In some embodiments, a conveyor belt comprises roller sets including top and bottom rollers, with the bottom roller extending below a bottom surface of the belt and the top roller extending above a top surface of the belt. The top and bottom rollers contact each other such that when the bottom roller is driven in a first angular direction, the top roller rotates in a second, opposite angular direction. In cases in which the rollers rotate in a direction that forms an angle with a longitudinal direction of the belt, the top rollers can be used to displace objects in a transverse and rearward direction such that objects can be diverted with relatively high diverting angles. In cases in which the rollers rotate in a direction parallel to the longitudinal direction of the belt, objects can be displaced on the belt in a direction opposite the direction of belt travel.

In the following, various embodiments of conveyor belts are disclosed. Although specific embodiments are presented, those embodiments are mere example implementations of the disclosed belts and it is noted that other embodiments are possible. All such embodiments are intended to fall within the scope of this disclosure.

Figure 1:
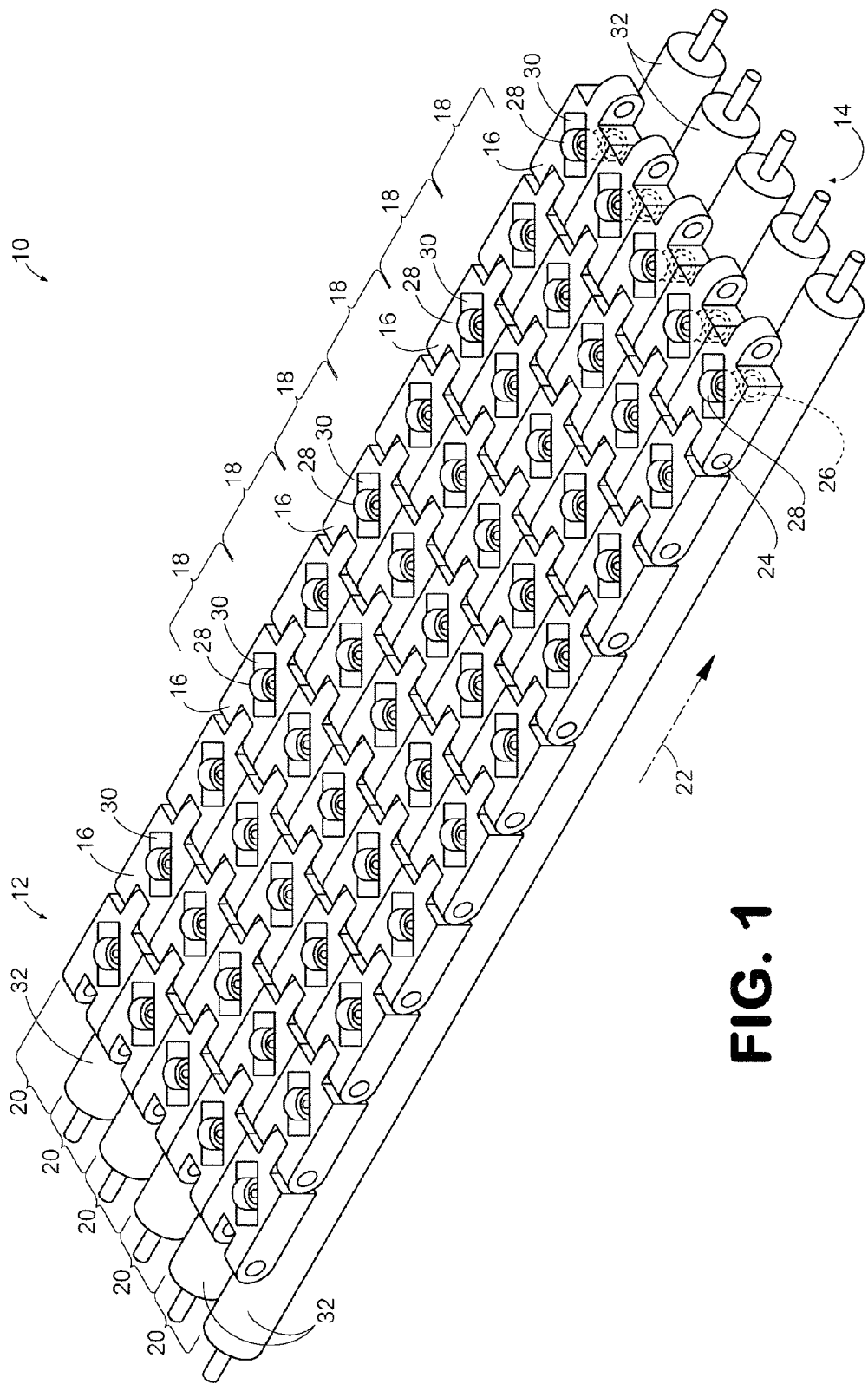
FIG. 1 is a top perspective view of a first embodiment of a portion of a conveyor.

Referring to the figures, in which like numerals indicate corresponding parts throughout the several views, FIG. 1 illustrates an embodiment of a conveyor 10 that can be used to divert objects. As indicated in FIG. 1, the conveyor 10 comprises a conveyor belt 12 and a drive mechanism 14 with which the belt can interact. In the embodiment of FIG. 1, the conveyor belt 12 comprises a plurality of conveyor belt modules 16 that are linked together to form the belt. The modules 16 are aligned in transverse rows 18 that extend across a width of the belt 12, and in longitudinal columns 20 that extend along a longitudinal direction of the belt, which coincides with the direction of belt travel indicated by arrow 22. By way of example, the modules 16 are pivotally connected to adjacent modules along the longitudinal direction of the belt 12 with transverse shafts 24. The modules 16 include roller sets that comprise a first or bottom roller 26 and second or top roller 28 that are arranged in a vertically-stacked orientation within an inner space 30 of the modules.

Figure 7:
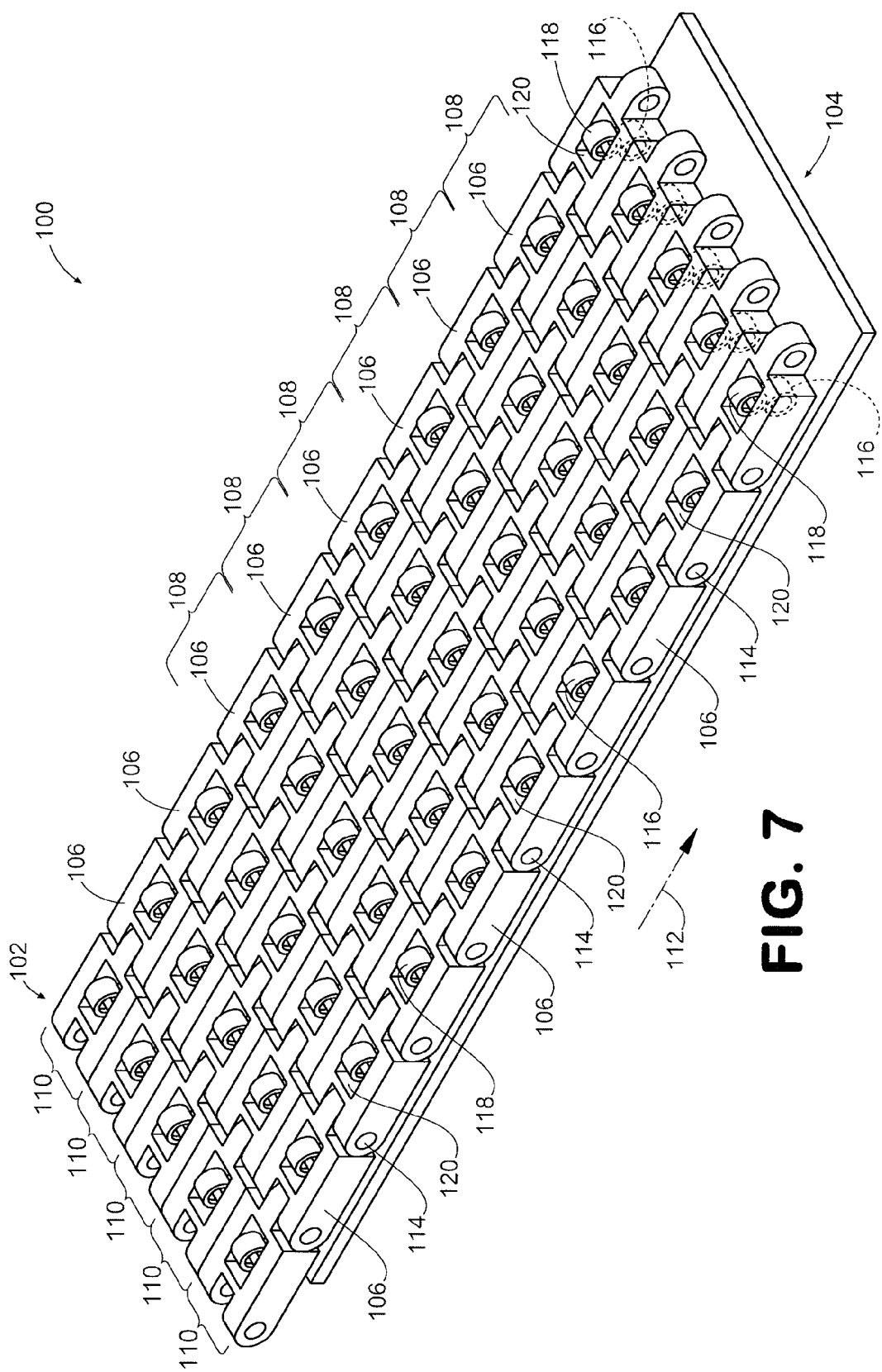
FIG. 7 a top perspective view of a second embodiment of a portion of a conveyor.

The drive mechanism 14 is used to drive the bottom and top rollers 26, 28 of the conveyor belt modules 16. As indicated in FIG. 1, the drive mechanism 14 can comprise multiple longitudinal rollers 32 having axes of rotation that are parallel to the longitudinal direction of the conveyor belt 12 and that align with the columns 20 of conveyor belt modules 16 such that one longitudinal roller is provided for each belt column. As described in greater detail below, when the longitudinal rollers 32 are placed in contact with the bottom rollers 26 while the belt 12 is moving, frictional forces between the longitudinal rollers and the bottom rollers cause the bottom rollers to rotate, which results in opposite rotation of the top rollers 28. In at least some embodiments, the longitudinal rollers 32 have high-friction outer surfaces that reduce slip between the longitudinal rollers 32 and the bottom rollers 26. In alternative embodiments, the drive mechanism can comprise a friction plate that is used to rotate the bottom rollers 26. An example of such a friction plate is illustrated in FIG. 7.

Figure 2:
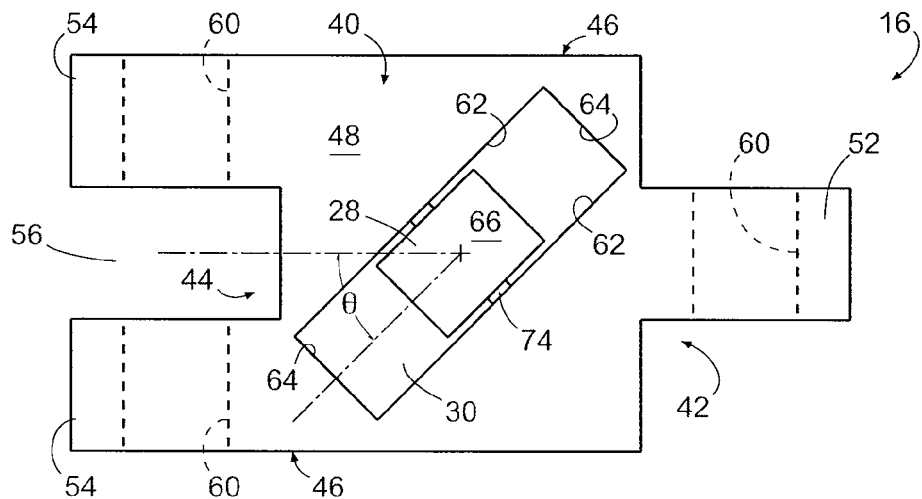
FIG. 2 is top view of an embodiment of a conveyor belt module used in the conveyor of FIG. 1.
Figure 3:
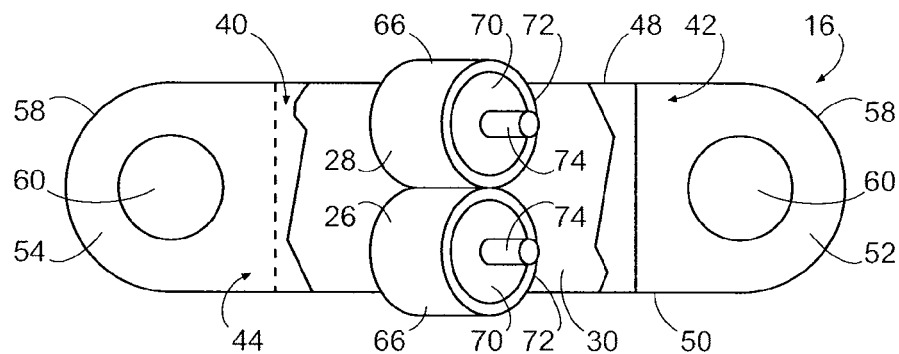
FIG. 3 is a side view of the conveyor belt module of FIG. 2.

FIGS. 2 and 3 illustrate an example embodiment for the conveyor belt module 16. As indicated in those figures, the module 16 comprises a body 40 having a front end 42, a rear end 44, and opposed lateral sides 46. Furthermore, the body 40 includes a top surface 48 and a bottom surface 50. Although particular spatial terminology such as "front" and "rear" have been used, those terms are used herein to describe the module 16 in its orientation shown in FIG. 1. Therefore, the spatial terms are not absolute and should not be interpreted as such.

In some embodiments, the module body 40 is unitarily constructed from a single piece of material, such as a polymeric material. In other embodiments, the body 40 comprises separate pieces, for example separate halves, that are connected together to form an integrated body. In such embodiments, the body 40 can be formed from a polymeric and/or metal material.

As shown most clearly in FIG. 2, the conveyor belt module 16 further includes connection portions that extend from body 40. In the embodiment of FIGS. 2 and 3, the module 16 comprises a single connection portion 52 that extends from the front end 42 of the body 40 and two connection portions 54 that extend from the rear end 44 of the body separated by a gap 56. With such a configuration, the modules 16 are adapted for linking to each other along the longitudinal direction of the belt. Specifically, the connection portion 52 of one module 16 can be received in the gap 56 of an adjacent module, the connection portion 52 of that adjacent module 16 can be received by the gap 56 of the next adjacent module 16, and so forth, as indicated in FIG. 1. As shown most clearly in FIG. 3, each of the connection portions 52, 54 includes a rounded outer surface 58 and a transverse opening 60 that is adapted to receive a transverse shaft, such as shaft 24 shown in FIG. 1. When the diameter of the transverse shaft is smaller than the openings 60, the modules 16 can pivotally rotate relative to the shaft and vice versa.

The module body 40 further defines the inner space 30 first identified in relation to FIG. 1. As indicated in FIG. 2, the inner space 30 can, in some embodiments, comprise a generally rectangular cross-section, when viewed from the top or bottom, defined by opposed side walls 62 and opposed end walls 64. As further indicated in FIG. 2, the side walls 62 are arranged at an angle relative to the lateral sides 46 of the module body 40, and therefore relative to a longitudinal axis of the module 16.

As is apparent from FIGS. 2 and 3, the bottom and top rollers 26, 28 are at least partially contained within the inner space 30 defined by the module body 40. As indicated in FIG. 3, outer surfaces 66 of the rollers 26, 28 contact each other such that rotation of one roller in a first direction causes opposite rotation of the other roller. A portion of the bottom roller 26 extends below the bottom surface 50 of the body 40 and a portion of the top roller 28 extends above the top surface 48 of the body. With such a configuration, the drive mechanism described in relation to FIG. 1 can contact the bottom roller 26 to cause it to rotate, and objects supported by the conveyor belt in which the module 16 is used can be displaced by the top roller 28.

Each roller can comprise a roller body 70 constructed of a polymeric or metal material that provides structure to the roller, and an outer layer 72 that is provided about an outer surface of the roller body and that forms the outer surface 66. In some embodiments, the outer layer 72 of each roller 26, 28 is composed of a high-friction material that reduces slip with mechanisms and/or objects it contacts. In other embodiments, only the outer layer 72 of the bottom roller 26 is a high-friction material so as to enable desired slipping between the top roller 28 and the objects it supports.

As illustrated in both FIGS. 2 and 3, each roller 26, 28 is mounted within the inner space 30 on a roller shaft 74 that is supported by the module body 40. In some embodiments, the shafts 74 are supported by openings (not shown) formed in the body 40. In other embodiments, the shafts 74 are supported by brackets (not shown) provided within the inner space 30. Regardless, the shafts 74 are supported such that their associated rollers 26, 28 are placed in firm contact with each other to ensure that rotation of one roller (e.g., the bottom roller) will cause opposite rotation of the other roller (e.g., the top roller).

As further illustrated in FIGS. 2 and 3, the shafts 74, and therefore their associated rollers 26, 28, are supported at an angle, θ, relative to a longitudinal axis of the module 16 and the conveyor belt in which it is used. In some embodiments, the angle, θ, can be any angle from about 1 degree, in which case the shaft 74 is nearly perpendicular to the longitudinal axis of the module 16, to about 89 degrees, in which case the shaft is nearly parallel to the longitudinal axis of the module. As described in greater detail below, the angle that is selected affects the speed with which objects are diverted from the conveyor belt.

Figure 4:
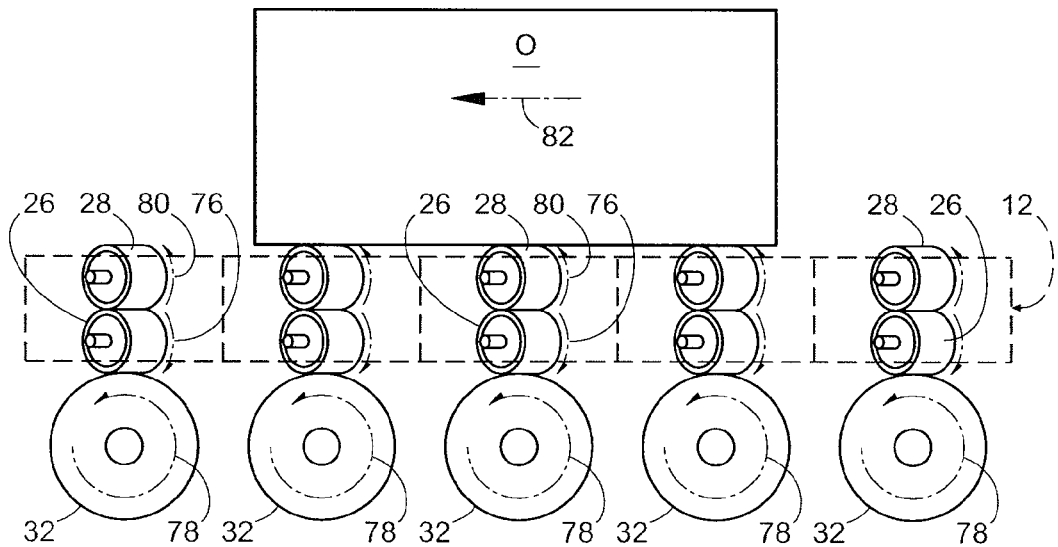
FIG. 4 is schematic end view of the conveyor of FIG. 1, illustrating diverting of an object conveyed by the conveyor.
Figure 5:
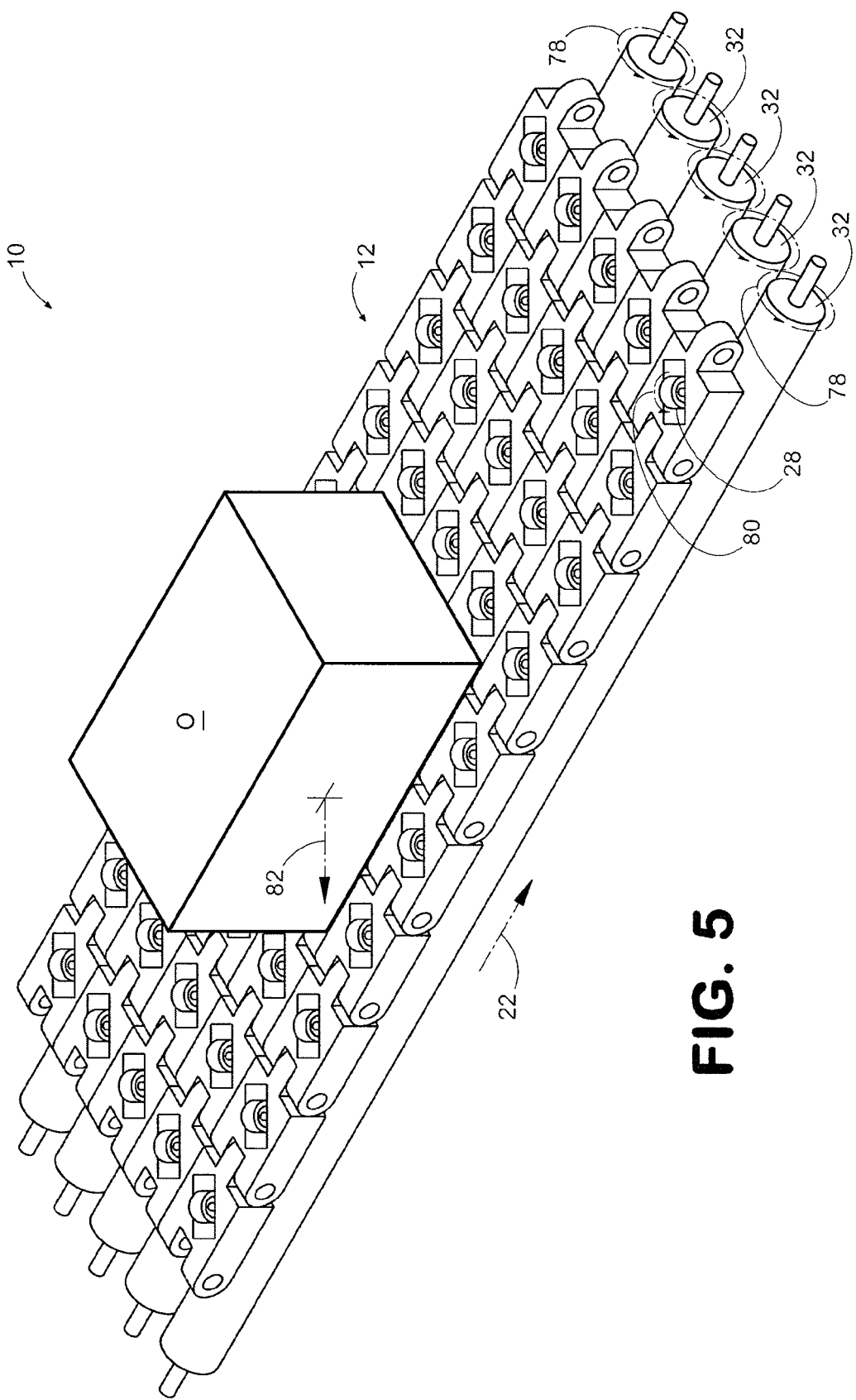
FIG. 5 is a top perspective view of the conveyor of FIG. 1, further illustrating diverting of the object by the conveyor.

FIGS. 4 and 5 illustrate diverting an object, O, using the conveyor 10. As indicated in FIG. 5, the conveyor belt 12 travels along the longitudinal rollers 32 in the direction of arrow 22. As indicated in FIG. 4, contact between the bottom rollers 26 and the longitudinal rollers 32 causes the bottom rollers to rotate in a downstream direction indicated by arrows 76. In addition, that contact causes the longitudinal rollers 32 to rotate in a counterclockwise direction (when viewed from a downstream position) as indicated by arrows 78. Rotation of the bottom rollers 26 causes the top rollers 28 to rotate in an opposite, upstream direction, indicated by arrows 80. As shown most clearly in FIG. 5, the rotation of the top rollers 28 displaces the object, O, in a transverse and rearward direction indicated by arrow 82. As used in the previous sentence, the term "rearward direction" is a relative term that indicates that the object, O, is displaced in a rearward direction relative to the conveyor belt 12. Since the belt 12 is travelling in the direction of arrow 22, however, the object, O, may not actually travel rearwardly in an absolute sense. Instead, assuming no slip between the bottom rollers 26 and the longitudinal rollers 32 and further assuming no slip between the top rollers 28 and the object, O, the longitudinal position of the object will substantially not change, due to the cancellation of its downstream movement by its upstream movement. In such a case, the object, O, is only transversely displaced by the conveyor 10.

The transverse diverting described above in relation to FIGS. 4 and 5 is illustrated in FIGS. 6A-6D. In those figures, the conveyor belt 12 travels from top to bottom as indicated by arrow 22. Positioned to one side of the conveyor belt 12 is an outfeed conveyor 84. In some embodiments, the outfeed conveyor 84 comprises its own driven conveyor belt so as to be adapted to convey a diverted object in a direction other than that in which the conveyor belt 12 travels. In other embodiments, the outfeed conveyor 84 comprises a non-driven conveyor that, for example, comprises a plurality of free-spinning wheels along which the object can travel, for instance under the force of gravity. Regardless, the outfeed conveyor 84 is adapted to receive objects diverted by the conveyor belt 12.

Figure 6A:
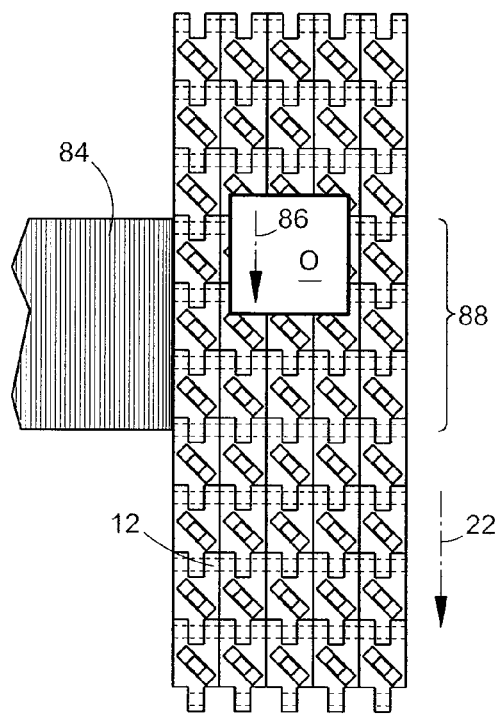
FIGS. 6A-6D are schematic views sequentially illustrating diverting of an object using the conveyor of FIG. 1.
Figure 6B:
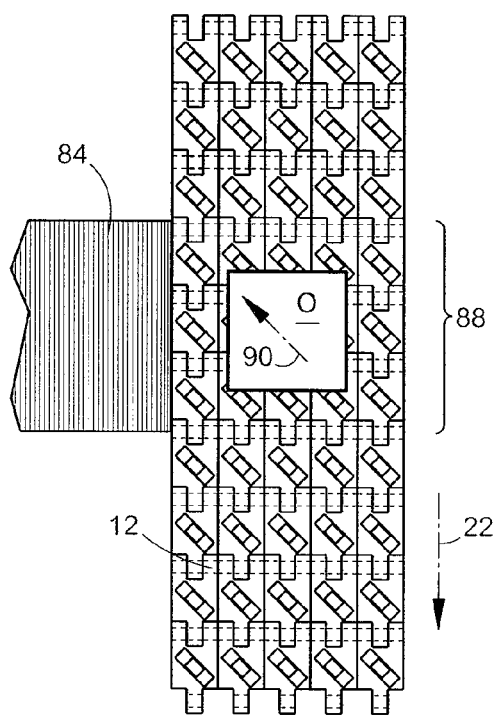
Figure 6C:
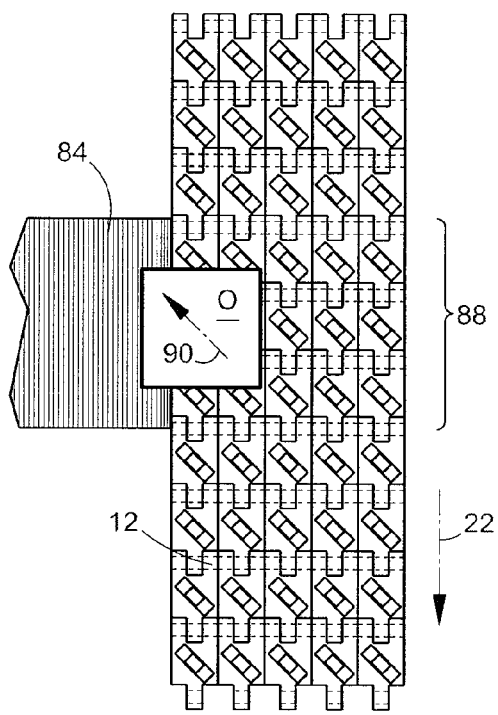
Figure 6D:
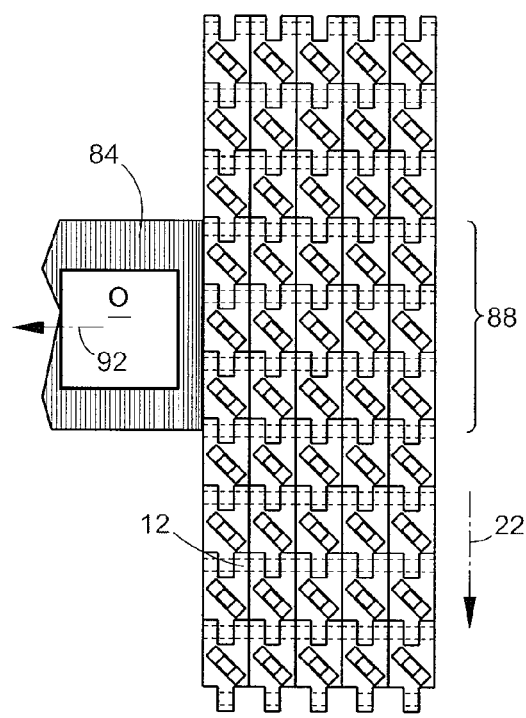

As indicated in FIG. 6A, an object, O, travels along the conveyor belt 12 in the direction indicated by arrow 86 and approaches a diverting area 88. Turning to FIG. 6B, once the object, O, enters the diverting area 88, the object is acted upon by the top rollers 28. In some embodiments, the top rollers 28 are activated in the diverting area 88 by a drive mechanism (not shown) that contacts the bottom rollers 26 of the belt only in the diverting area. In such cases, the bottom rollers 26, and the top rollers 28, will begin to rotate upon entering the diverting area 88. As indicated in FIG. 6B, rotation of the top rollers 28 causes the object, O, to be displaced in a transverse and rearward direction indicated by arrow 90. As described above, the rearward travel of the object, O, relative to the belt 12 may be substantially equivalent to forward travel of the object due to movement of the belt. In such cases, the object, O, does not significantly move forward or rearward in an absolute sense. Accordingly, as indicated in FIG. 6C, the object, O, is primarily displaced in the transverse direction toward the conveyor 84. In other words, the object, O, is diverted from the conveyor belt 12 at a diverting angle of approximately 90 degrees. Notably, such a diverting angle is substantially larger than that achievable with other conveyor belts that comprise single rollers that are not provided in a stacked configuration. Continuing on to FIG. 6D, the object, O, is shown completely diverted from the conveyor belt 12, at which point the object may be carried away by the conveyor 84 in the direction indicated by arrow 92.

The substantially 90 degree diverting action described above occurs for any angle, θ, selected from 1 degree to 89 degrees (see FIG. 2). Therefore, objects will be diverted from the conveyor belt 12 at an angle of approximately 90 degrees regardless of the angle of the top rollers 28 that is selected, assuming no slip and no gearing effect (described below). The selected angle, however, affects the speed with which the objects will be diverted. Specifically, the larger the angle, θ, the faster the object will be diverted. Notably, when the top rollers 28 are positioned at a 45 degree angle relative to the longitudinal direction of the belt, the objects will be diverted from the belt at a speed approximately equal to the speed of belt travel, again assuming no slip and no gearing effect.

FIG. 7 illustrates an embodiment of a conveyor 100 that can be used to control the positioning of conveyed objects. As indicated in FIG. 7, the conveyor 100 comprises a conveyor belt 102 and a drive mechanism 104 with which the belt can interact. In the embodiment of FIG. 7, the conveyor belt 102 comprises a plurality of conveyor belt modules 106 that are linked together to form the belt. The modules 106 are aligned in transverse rows 108 that extend across a width of the belt 102, and in longitudinal columns 110 that extend along a longitudinal direction of the belt, which coincides with the direction of belt travel indicated by arrow 112. By way of example, the modules 106 are pivotally connected to adjacent modules along the longitudinal direction of the belt 102 with transverse shafts 114. Like the modules 16 shown in FIG. 1, the modules 106 include roller sets that comprise a first or bottom roller 116 and second or top roller 118 that are arranged in a vertically-stacked configuration within an inner space 120 of the modules.

The drive mechanism 104 is used to drive the bottom and top rollers 116, 118 of the conveyor belt modules 106. As indicated in FIG. 7, the drive mechanism 104 can comprise a friction plate that is used to rotate the bottom rollers 116. In at least some embodiments, the friction plate has a high-friction top surface that reduces slip between the plate and the bottom rollers 116.

Figure 8:
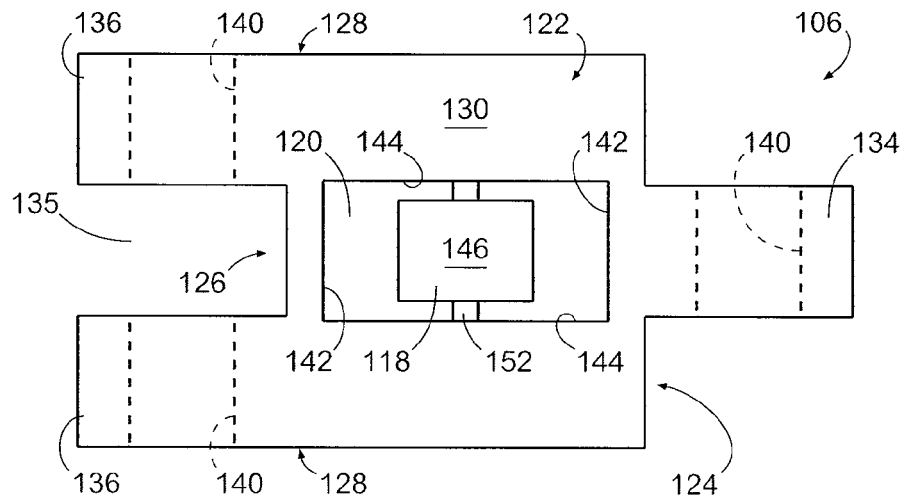
FIG. 8 is a top view of an embodiment of a conveyor belt module used in the conveyor of FIG. 7.
Figure 9:
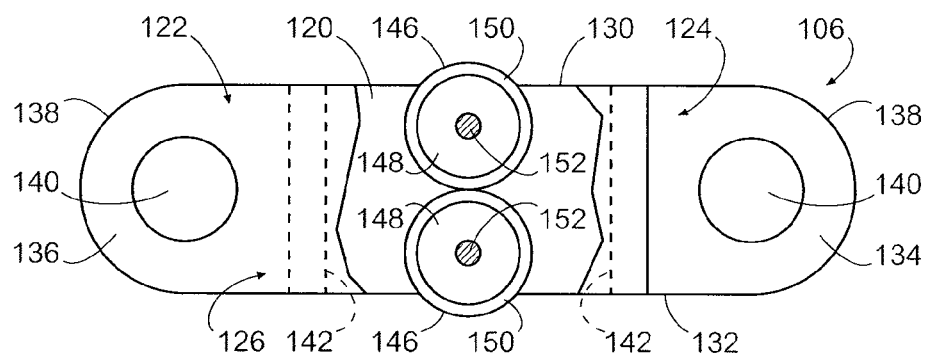
FIG. 9 is side view of the conveyor belt module of FIG. 8.

FIGS. 8 and 9 illustrate an example embodiment for the conveyor belt module 106. The module 106 is similar in many ways to the module 16 illustrated in FIGS. 2 and 3. Therefore, as indicated in FIGS. 8 and 9, the module 106 comprises a body 122 having a front end 124, a rear end 126, and opposed lateral sides 128. Furthermore, the body 122 includes a top surface 130 and a bottom surface 132. Again, the spatial terminology is used to reflect the orientation of the module 106 indicated in FIG. 7 and is not intended to be absolute.

As shown most clearly in FIG. 8, the conveyor belt module 106 further includes connection portions that extend from body 122. In the embodiment of FIGS. 8 and 9, the module 106 comprises a single connection portion 134 that extends from the front end 124 of the body 122 and two connection portions 136 that extend from the rear end 126 of the body separated by a gap 135. As shown most clearly in FIG. 3, each of the connection portions 134, 136 includes a rounded outer surface 138 and a transverse opening 140 that is adapted to receive a transverse shaft, such as shaft 114 shown in FIG. 7. When the diameter of the transverse shaft is smaller than the openings 140, the modules 106 can pivotally rotate relative to the shaft and vice versa.

The module body 122 further defines the inner space 120 first identified in relation to FIG. 7. As indicated in FIG. 8, the inner space 120 can, in some embodiments, comprise a generally rectangular cross-section, when viewed from the top or bottom, defined by opposed side walls 142 and opposed end walls 144. As further indicated in FIG. 8, the side walls 142 of the modules 106 are generally parallel to the lateral sides 128 of the module body 122 and, therefore, are generally parallel to a longitudinal axis of the module.

As is apparent from FIGS. 8 and 9, the bottom and top rollers 116, 118 are at least partially contained within the inner space 120 defined by the module body 122. As indicated in FIG. 9, outer surfaces 146 of the rollers 116, 118 contact each other such that rotation of one roller in a first direction causes opposite rotation of the other roller. A portion of the bottom roller 116 extends below the bottom surface 132 of the body 122 and a portion of the top roller 118 extends above the top surface 130 of the body. With such a configuration, the drive mechanism described in relation to FIG. 7 can contact the bottom roller 116 to cause it to rotate, and objects supported by the conveyor belt in which the module 116 is used can be displaced by the top roller 118.

Each roller 116, 118 can comprise a roller body 148 constructed of a polymeric or metal material that provides structure to the roller, and an outer layer 150 that is provided about an outer surface of the roller body and that forms the outer surface 146. In some embodiments, the outer layer 150 of each roller 116, 118 is composed of a high-friction material that reduces slip with mechanisms and/or objects it contacts.

As illustrated in both FIGS. 8 and 9, each roller 116, 118 is mounted within the inner space 120 on a roller shaft 152 that is supported by the module body 122. In some embodiments, the shafts 152 are supported by openings (not shown) formed in the body 122. In other embodiments, the shafts 152 are supported by brackets (not shown) provided within the inner space 120. Regardless, the shafts 152 are supported such that their associated rollers 116, 118 are placed in firm contact with each other to ensure that rotation of one roller (e.g., the bottom roller) will cause opposite rotation of the other roller (e.g., the top roller). As further illustrated in both FIGS. 8 and 9, the shafts 152 are oriented so as to be substantially perpendicular to the longitudinal axis of the module 106 and the conveyor belt in which it is used.

Figure 10:
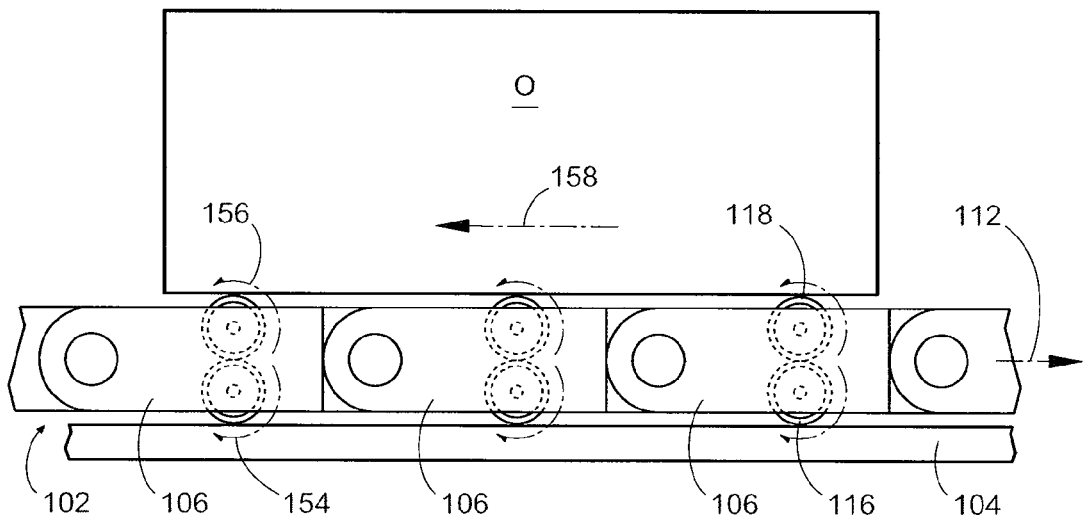
FIG. 10 is a side view of the conveyor of FIG. 7, illustrating displacing of an object conveyed by the conveyor.
Figure 11:
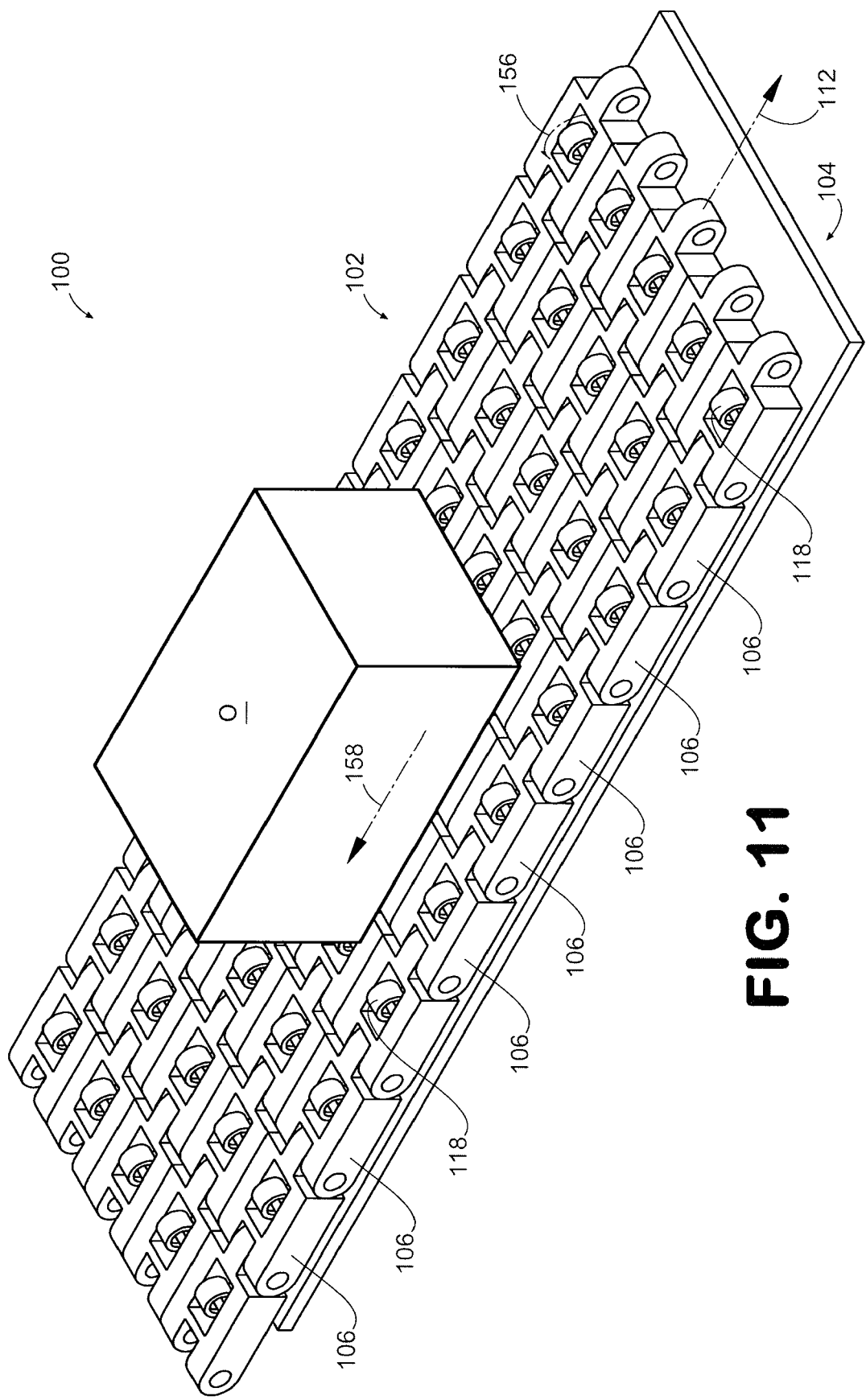
FIG. 11 is a top perspective view of the conveyor of FIG. 7, further illustrating displacing of the object by the conveyor.

FIGS. 10 and 11 illustrate displacement an object, O, on the conveyor 100. As indicated in FIG. 11, conveyor belt 102 travels along the drive mechanism 104 in the direction of arrow 112. As indicated in FIG. 10, contact between the bottom rollers 116 and the drive mechanism 104 causes the bottom rollers to rotate in a downstream direction indicated by arrows 154. Rotation of the bottom rollers 116 causes the top rollers 118 to rotate in an opposite, upstream direction, indicated by arrows 156. As shown in both FIGS. 10 and 11, the rotation of the top rollers 118 displaces the object, O, in a rearward direction relative to the belt 102 indicated by arrow 158. Assuming no slip between the bottom rollers 116 and the drive mechanism 114 and further assuming no slip between the top rollers 118 and the object, O, the absolute position of the object will substantially not change, due to the cancellation of its downstream movement by its upstream movement. In such a case, the object, O, will be held in place in an absolute sense. With such functionality, the transport of objects provided on the belt 102 can be selectively stopped by engaging the drive mechanism 104 with the bottom rollers 116 of the belt at a location at which the object is to be halted.

Figure 12A:
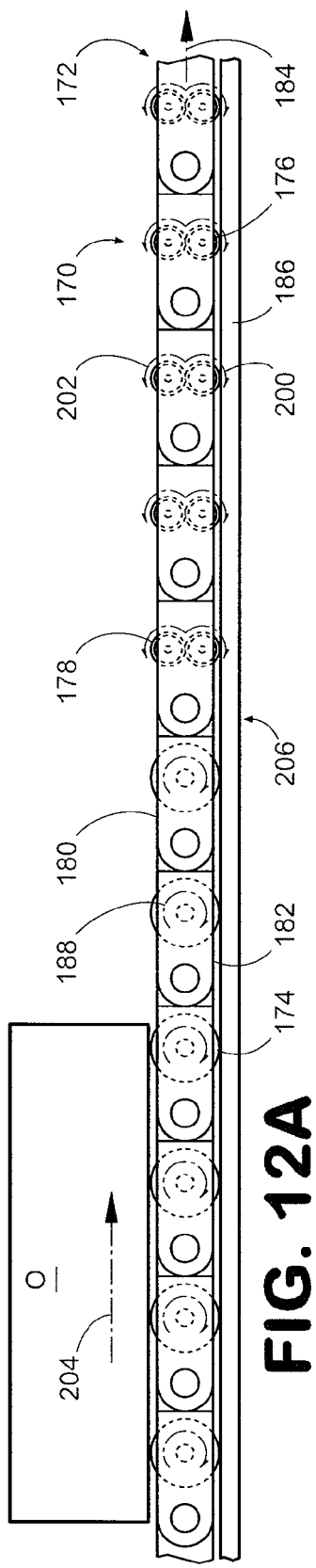
FIGS. 12A-12C are schematic side views of an embodiment of a portion of a third conveyor, the views sequentially illustrating controlling a position of an object along the length of a conveyor belt.
Figure 12B:
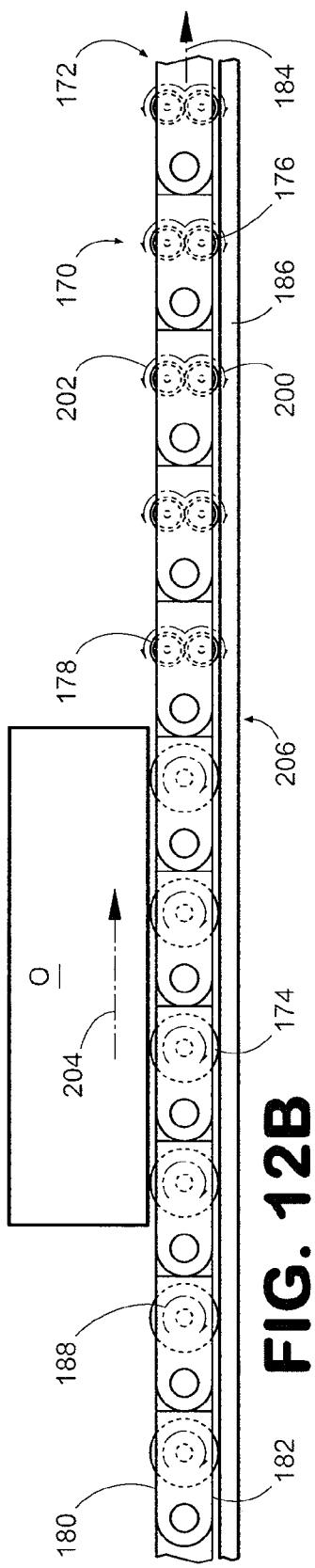
Figure 12C:
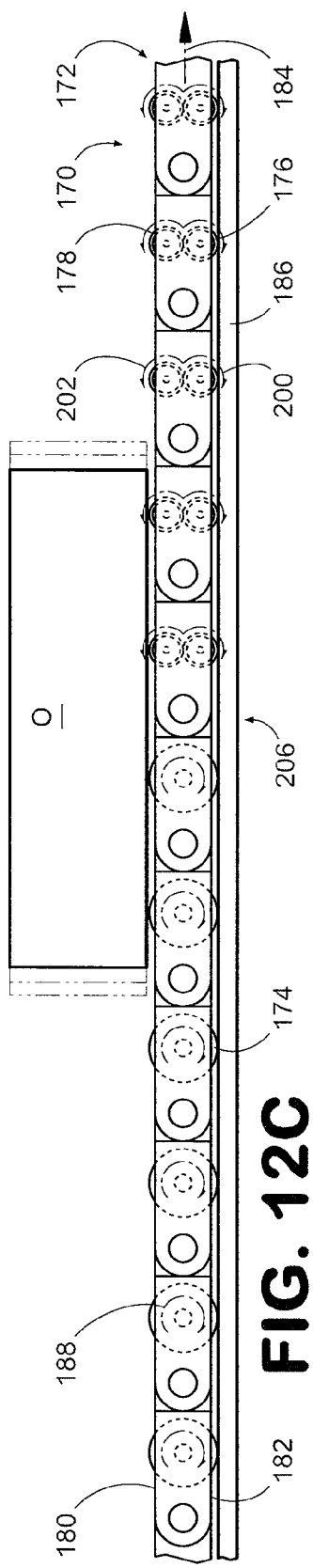

FIGS. 12A-12C schematically illustrate a third embodiment of a conveyor 170 having a conveyor belt 172 that can be used to stop the motion of an object relative to the conveyor belt. Accordingly, the object can be selectively stopped at a desired point along the length of the belt 172, without using a physical stop against which the object abuts. As indicated in FIGS. 12A-12C, the conveyor belt 172 comprises a plurality of relatively large rollers 174 and a plurality of relatively small, vertically-stacked rollers including first or bottom rollers 176 and second or top rollers 178. In at least some embodiments, each roller is provided in a conveyor belt module similar to those described above. Regardless, the large rollers 174 extend beyond top and bottom surfaces 180 and 182 of the belt 172, the bottom rollers 176 extend below the bottom surface of the belt, and the top rollers 178 extend above the top surface of the belt.

As indicated in FIG. 12A, the conveyor belt 172 travels in the direction indicated by arrow 184. Contact between the large rollers 174 and the bottom rollers 176 with the drive mechanism 186, for example a friction plate, causes those rollers to rotate in a downstream direction indicated by arrows 188 and 200, respectively. Rotation of the bottom rollers 176 causes the top rollers 178 to rotate in an upstream direction indicated by arrows 202.

With further reference to FIG. 12A, an object, O, is driven forward along the belt 172 by the large rollers 174 in the direction indicated by arrow 204. Turning to FIG. 12B, the object, O, is therefore displaced downstream along the belt 176 toward a stopping area 206. As indicated in FIG. 12C, once the object, O, reaches the stopping area 206, the object is acted upon by both the large rollers 174 and the top rollers 178. The object, O, is therefore simultaneously urged in a downstream direction by the large rollers 176 and an upstream direction by the top rollers 178. Ultimately, the object, O, reaches an equilibrium state in which the forces driving it downstream substantially equal the forces driving it upstream, resulting in motion of the object along the belt 172 being halted as long as the drive mechanism 186 engages the rollers 174 and 176.

FIGS. 13 and 14 illustrate alternative embodiments for a first or bottom roller 210 and a second or top roller 212 that can be used in a conveyor belt, such as belt 10 or belt 100 described above. As indicated in FIG. 14, the top roller 212 comprises at least two portions having different diameters. In the embodiment of FIG. 14, the top roller 212 has a first or inner portion 214 that is positioned between two second or outer portions 216. The inner portion 214 has a reduced diameter that is smaller than the diameter of the outer portions 216. Accordingly, a high-friction outer surface 218 of the inner portion 214 is positioned more closely to the roller's axis of rotation 222 than the outer surfaces 220 of the outer portions 216. Coincident with the axis of rotation 222 is a transverse opening 224 adapted to receive a roller shaft about which the roller 212 can rotate. As described below, the extent to which the inner portion 214 is reduced depends upon the extent of a gearing effect that is desired. However, the inner portion 214 is at least wide enough to receive the bottom roller 210, as indicated in FIG. 14.

The bottom roller 210 has its own high-friction outer surface 226, axis of rotation 228, and transverse opening 230. The diameter of the bottom roller 210 is greater than the diameter of the top roller inner portion 214. In some embodiments, the bottom roller 210 has a diameter that is approximately equal to the diameter of the top roller outer portions 216.

In use, the outer surface 226 of the bottom roller 210 is placed in firm contact with the outer surface 218 of the top roller inner portion 214 with the rollers 210, 212 arranged in a vertically-stacked orientation of the nature described in the foregoing. By way of example, such an orientation can be established using a conveyor belt module, such as module 16 or module 116. As indicated in FIG. 13, rotation of the bottom roller 210 will therefore cause rotation of the top roller 212. When the diameter of the bottom roller 210 is larger than that of the top roller inner portion 214 and the diameter of the inner portion is smaller than that of the outer portions 216, a gearing effect results in which the outer surfaces 220 of the top roller outer portions 216 travel at a faster speed (tangential velocity) than the outer surface 226 of the bottom roller such that objects can be displaced at a faster rate than the speed of belt travel.

The above-described gearing effect can be utilized in various applications. In applications in which a conveyor belt is oriented in similar fashion to conveyor belt 10 of FIG. 1, the gearing affect can be used to further increase the diverting angle. For example, if slip reduces the diverting angle to an angle below 90 degrees, the gearing effect can be used to counteract the slip and provide a true 90 degree divert. Depending upon the amount of gearing effect present, objects can even be diverted at angles larger than 90 degrees, in which case the objects are diverted in a direction having a component opposite to the direction of belt travel. In applications in which a conveyor belt is oriented in similar fashion to conveyor belt 100 of FIG. 7, in which the belt rollers have axes of rotation substantially perpendicular to the direction of belt travel, the gearing effect can be used to displace selected objects upstream not only relative to the conveyor belt but in an absolute sense. Therefore, the object can, for example, be moved in a direction opposite to that in which the conveyor belt travels to place the object in a predetermined position. If desired, the rollers can be selectively activated in a cyclical manner to move the object upstream from a given location of the conveyor, allow the object to return to the given location, again move the object upstream, and so forth. In situations in which the extent to which the diameter of the inner portion 214 is reduced is slight, for instance a few percent smaller than the diameter of the outer portions 216, the object can be displaced upstream to a slightly larger degree than it is displaced downstream due to belt travel. Such net upstream displacement may be sufficient to counteract any slippage of the object relative to the top rollers 212 to ensure the object is maintained in a particular position along the length of the conveyor. As will be appreciated by persons having ordinary skill in the art, many other applications exist for the above-described gearing effect.

Notably, the embodiment illustrated in FIGS. 13 and 14 and described in the foregoing is exemplary only. Therefore, many different combinations of diameters may be selected for the top roller inner portion, the top roller outer portions, and the bottom roller depending upon what result is desired. Furthermore, although the reduced diameter portion of the top roller is described as an "inner" portion positioned between two "outer portions," the top roller need only comprise one relatively large diameter portion and one relatively small diameter portion to enable the gearing effect. Moreover, although the top roller has been described above as comprising the two different diameter portions, the configuration of the top and bottom rollers could be reversed such that the bottom roller comprises the two different diameter portions, if desired. Indeed, in some embodiments, both the top and bottom rollers can comprise portions having different diameters. Again, the particular configuration of the rollers depends upon the desired outcome.

FIG. 15 illustrates further alternative embodiments for a first or bottom roller 240 and a second or top roller 242 that can be used in a conveyor belt, such as belt 10 or belt 100 described above. As indicated in FIG. 15, the rollers 240, 242 comprise a roller body 244 that provides structure and an outer layer 246 that is provided about an outer surface 248 of the roller body. Each roller body 244 defines a transverse opening 250 adapted to receive a roller shaft about which the roller can rotate. By way of example, the roller body 244 is constructed of a polymeric or metal material.

As further indicated in FIG. 15, the outer layer 246 of each roller 242, 240 comprises an outer surface 252 having a plurality of teeth 254 adapted to mesh with corresponding teeth of the other roller. With such an arrangement, slip between the rollers 242, 240 can be substantially eliminated. In at least some embodiments, the outer layers 246 are composed of a resilient or at least pliable material. In such cases, slip between the bottom roller 240 and a drive mechanism (e.g., longitudinal rollers or friction plate) can be avoided as can slip between the top roller 242 and objects conveyed by a belt in which the rollers are used.

While particular embodiments have been disclosed in detail in the foregoing description and drawings for purposes of example, it will be understood by those skilled in the art that variations and modifications thereof can be made without departing from the scope of the disclosure.

The invention claimed is:

1. A conveyor belt comprising:
a top surface;
a bottom surface; and
multiple roller sets that are mounted to the conveyor belt, each roller set including a bottom roller and a top roller, the bottom roller extending below the bottom surface of the conveyor belt so as to be adapted to contact a drive mechanism and the top roller being adapted to contact objects conveyed by the conveyor belt, the bottom and top rollers further being configured such that contact between the bottom rollers and the drive mechanism causes the bottom rollers to rotate in a first direction and wherein rotation of the bottom rollers causes the top rollers to rotate in a second direction opposite to the first direction.

2. The conveyor belt of claim 1, wherein the bottom and top rollers directly contact each other.

3. The conveyor belt of claim 1, wherein the first and second rollers have axes of rotation that are substantially perpendicular to a longitudinal direction of the conveyor belt.

4. The conveyor belt of claim 1, wherein the first and second rollers have axes of rotation that are arranged at an angle relative to a longitudinal direction of the conveyor belt.

5. The conveyor belt of claim 1, further comprising a plurality of conveyor belt modules that are linked together to form the conveyor belt, at least some of the modules comprising a roller set.

6. The conveyor belt of claim 5, wherein the conveyor belt modules that comprise a roller set include an inner space in which the roller set is positioned.

7. A conveyor comprising:
a conveyor belt;
a roller drive mechanism; and
multiple roller sets, each roller set including a bottom roller and a top roller arranged in a vertically-stacked configuration, the bottom roller of each roller set being adapted to contact the roller drive mechanism and the top roller being adapted to contact objects conveyed by the conveyor;
wherein contact between the bottom rollers and the drive mechanism causes the bottom rollers to rotate in a first direction and wherein rotation of the bottom rollers causes the top rollers to rotate in a second direction opposite to the first direction.

8. The conveyor of claim 7, wherein the bottom and top rollers directly contact each other.

9. The conveyor of claim 7, wherein the first and second rollers have axes of rotation that are substantially perpendicular to a longitudinal direction of the conveyor.

10. The conveyor of claim 7, wherein the first and second rollers have axes of rotation that are arranged at an angle relative to a longitudinal direction of the conveyor.

* * * * *